US011987219B2

(12) United States Patent
Aza

(10) Patent No.: US 11,987,219 B2
(45) Date of Patent: May 21, 2024

(54) INTEGRATED JACK SYSTEM FOR A VEHICLE

(71) Applicant: John Justine Aza, Phoenix, AZ (US)

(72) Inventor: John Justine Aza, Phoenix, AZ (US)

( * ) Notice: Subject to any disclaimer, the term of this patent is extended or adjusted under 35 U.S.C. 154(b) by 148 days.

(21) Appl. No.: 17/407,287

(22) Filed: Aug. 20, 2021

(65) Prior Publication Data

US 2022/0063572 A1     Mar. 3, 2022

Related U.S. Application Data

(60) Provisional application No. 63/069,976, filed on Aug. 25, 2020.

(51) Int. Cl.
 *B60S 9/12* (2006.01)
(52) U.S. Cl.
 CPC ........................ *B60S 9/12* (2013.01)
(58) Field of Classification Search
 CPC .................................................. B60S 9/02–12
 See application file for complete search history.

(56) References Cited

U.S. PATENT DOCUMENTS

| | | | | |
|---|---|---|---|---|
| 2,194,594 A * | 3/1940 | Halley | ...................... | B60S 9/12 |
| | | | | 254/93 VA |
| 4,067,543 A * | 1/1978 | Orth | .......................... | B66F 3/44 |
| | | | | 254/425 |
| 5,713,560 A | 2/1998 | Guarino | | |
| 8,365,331 B1 | 2/2013 | Young | | |
| 8,919,739 B1 * | 12/2014 | Romero | .................... | B60S 9/12 |
| | | | | 254/423 |
| 2002/0008231 A1 | 1/2002 | Glovatsky et al. | | |
| 2005/0127343 A1 * | 6/2005 | Jackson | .................... | B60S 9/12 |
| | | | | 254/423 |
| 2018/0170323 A1 * | 6/2018 | Darius | ...................... | B60S 9/12 |
| 2019/0061706 A1 * | 2/2019 | Kirby | ........................ | B60S 9/04 |

FOREIGN PATENT DOCUMENTS

DE        102017130144 A1 *  6/2018   ................ B60S 9/02

* cited by examiner

*Primary Examiner* — Tyrone V Hall, Jr.
(74) *Attorney, Agent, or Firm* — Boudwin Intellectual Property Law, LLC; Daniel Boudwin

(57) ABSTRACT

An integrated jack system for a vehicle is provided. The system includes a plurality of jack assemblies disposed within a vehicle frame, wherein each of the plurality of jack assemblies is disposed adjacent to a vehicle wheelbase. Each of the jack assemblies includes a plurality of telescopic, wherein a plurality of controls actuates the plurality of jack assemblies between the extended position and the retracted position. A display is operably connected to a weight sensor disposed within each of the plurality of jack assemblies to display a weight supported by each jack assembly. A width of each telescopic member increases in width from a proximal end of the jack assembly to a distal end of the jack assembly. Each of the jack assemblies terminates in a foot member, wherein a lower surface of the foot member frictionally engages a ground surface when the jack assembly is in the extended position.

12 Claims, 5 Drawing Sheets

INTEGRATED JACK SYSTEM FOR A VEHICLE

CROSS REFERENCE TO RELATED APPLICATIONS

This application claims the benefit of U.S. Provisional Application No. 63/069,976 filed on Aug. 25, 2020. The above identified patent application is herein incorporated by reference in its entirety to provide continuity of disclosure.

BACKGROUND OF THE INVENTION

The present invention relates to vehicle jack systems. More particularly, the present invention pertains to a plurality of jack assemblies integrated into an existing vehicle frame.

Many individuals have been forced to use a mechanical vehicle jack to change a tire, however mechanical jacks are often difficult and frustrating to user correctly. Individuals must often lay on or kneel on a road surface to correctly position the mechanical jack under the vehicle, which can be uncomfortable and damage their clothing. Often, traditional jacks fail to find stable purchase on the vehicle frame, risking the vehicle sliding off of the jack. Alternatively, traditional jacks place a large load on a relatively narrow piston, which can result in the jack breaking. In either case, when a mechanical jack fails, the vehicle can often suffer significant damage to its frame, as well as potentially injuring the individual as the vehicle falls on themselves. Therefore, an integrated vehicle jack system that can efficiently and safely elevate a desired portion of a vehicle is desired.

In light of the devices disclosed in the known art, it is submitted that the present invention substantially diverges in design elements from the known art and consequently it is clear that there is a need in the art for an improvement to existing vehicle jack systems. In this regard, the instant invention substantially fulfills these needs.

SUMMARY OF THE INVENTION

In view of the foregoing disadvantages inherent in the known types of vehicle jack systems now present in the known art, the present invention provides an integrated vehicle jack system wherein the same can be utilized for providing convenience for the user when selectively elevating one or more wheels from a ground surface with increased efficiency and minimal effort.

The present system comprises a plurality of jack assemblies disposed within a vehicle frame, wherein each of the plurality of jack assemblies is disposed adjacent to a vehicle wheelbase. Each of the jack assemblies comprises a plurality of telescopic member selectively movable between an extended position and a retracted position. A plurality of controls is disposed within a vehicle cabin, wherein the plurality of controls is configured to actuate the plurality of jack assemblies between the extended position and the retracted position. In some embodiments, a controller housing is in wireless communication with each of the plurality of jack assemblies, wherein the controller housing includes a plurality of controls configured to actuate the plurality of jack assemblies between the extended position and the retracted position when actuated. A display is disposed on either the controller housing or within the vehicle cabin, wherein the display is operably connected to a weight sensor disposed within each of the plurality of jack assemblies to display a weight supported by each of the plurality of jack assemblies. A width of each telescopic member of the plurality of telescopic members increases in width from a proximal end of the jack assembly to a distal end of the jack assembly. Each of the jack assemblies terminates in a foot member, wherein a lower surface of the foot member frictionally engages a ground surface when the jack assembly is in the extended position.

In some embodiments, the plurality of jack assemblies is operably connected to a hydraulic tank disposed within the vehicle frame, such that the plurality of jack assemblies is hydraulically actuated. In another embodiment, the hydraulic tank is centrally disposed within the vehicle frame. In other embodiments, each of the plurality of jack assemblies are hingedly affixed to the vehicle frame, such that the plurality of jack assemblies selectively moves between a deployed position perpendicular to the vehicle frame and a stored position parallel to the vehicle frame. In yet another embodiment, a plurality of recesses is disposed within the vehicle frame, wherein each recess is dimensioned to receive a jack assembly of the plurality of jack assemblies therein when the jack assembly is in the stored position. In some embodiments, the foot member tapers radially outwardly such that the lower surface of the foot member comprises a greater width than an upper end of the foot member. In another embodiment, a plurality of textured elements is disposed along the lower surface of the foot member. In other embodiments, the plurality of controls includes at least an extension control and a retraction control for each of the plurality of jack assemblies, such that each jack assembly can be independently actuated. In yet another embodiment, the plurality of jack assemblies is actuated via an electric motor. In some embodiments, the plurality of jack assemblies comprises a pneumatic system.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
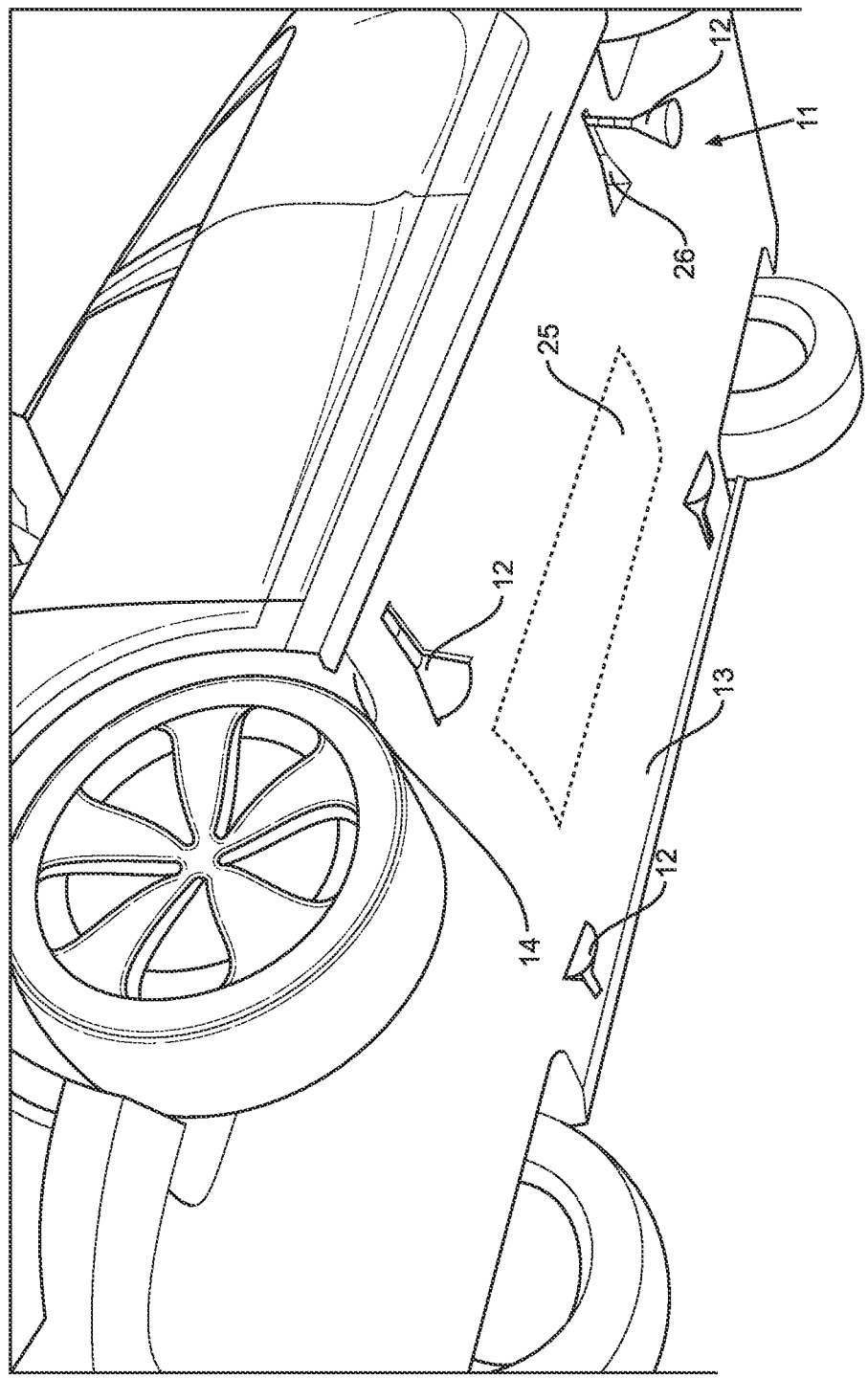
FIG. 1 shows a perspective view of an embodiment of the integrated jack system for a vehicle.

Reference is made herein to the attached drawings. Like reference numerals are used throughout the drawings to depict like or similar elements of the integrated jack system for a vehicle. The figures are intended for representative purposes only and should not be considered to be limiting in any respect.

Referring now to FIG. 1, there is shown a perspective view of an embodiment of the integrated jack system for a vehicle. The integrated jack system for a vehicle 11 comprises a plurality of jack assemblies 12 disposed within a vehicle frame 13, wherein each of the plurality of jack assemblies 12 are disposed adjacent to each vehicle wheelbase 14. The plurality of jack assemblies 12 can be selectively deployed to raise one or more portions of the vehicle frame 13 to facilitate changing a vehicle tire or to provide access to the underside of the vehicle frame 13 as further described herein. In the shown embodiment, a plurality of recesses 26 are disposed adjacent to each of the plurality of jack assemblies 12, wherein each of the plurality of recesses 26 are dimensioned to receive a jack assembly 12 therein. In this manner, the plurality of jack assemblies 12 are stored in a low-profile manner when not in use, so as not to interfere with the operation of the vehicle while in use. In the illustrated embodiment, the integrated jack system for a vehicle 11 further comprises a hydraulic tank 25 centrally disposed within the vehicle frame 13, such that the weight of the hydraulic tank 25 is evenly distributed across the vehicle frame 13. The hydraulic tank 25 is operably connected to each of the plurality of jack assemblies 12 to selectively extend and retract the plurality of jack assemblies 12 via hydraulic actuation. In other embodiments, each jack of the plurality of jack assemblies 12 is separately connected to a distinct localized hydraulic tank disposed adjacent to each jack of the plurality of jack assemblies 12, such that each jack is independently operable. In this manner, should one localized hydraulic tank be damaged, such as during a vehicular accident, the remaining jacks of the plurality of hydraulic jacks 12 would retain functionality. In alternate embodiments, the plurality of jack assemblies 12 are actuated via pneumatic actuation or electrical actuation.

Figure 2B:
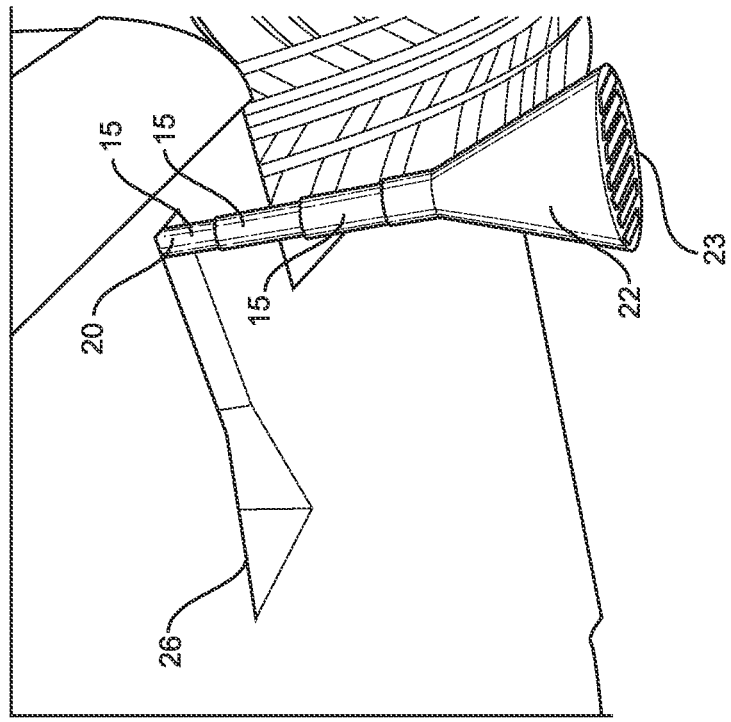
FIG. 2B shows a perspective view of a jack assembly of an embodiment of the integrated jack system for a vehicle in an extended position.
Figure 2A:
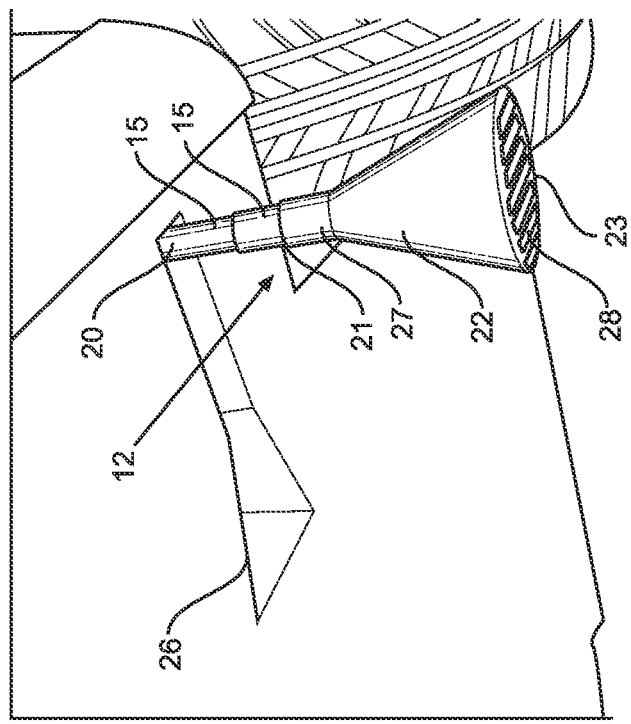
FIG. 2A shows a perspective view of a jack assembly of an embodiment of the integrated jack system for a vehicle in a retracted position.

Referring now to FIGS. 2A and 2B, there is shown a perspective view of a jack assembly of an embodiment of the integrated jack system for a vehicle in a retracted position and a perspective view of a jack assembly of an embodiment of the integrated jack system for a vehicle in an extended position, respectively. In the illustrated embodiment, each jack assembly of the plurality of jack assemblies 12 comprises a plurality of telescopic members 15 selectively movable between a retracted position (as shown in FIG. 2A) and an extended position (as shown in FIG. 2B), wherein the extended position the plurality of jack assemblies 12 are configured to frictionally engage a ground surface to elevate a portion of the vehicle frame, such as to elevate a vehicle wheel to replace a tire or perform maintenance on the vehicle. The plurality of telescopic members 15 gradually increase in width from a proximal end 20 of the plurality of telescopic members 15 to a distal end 21 of the plurality of telescopic members 15. In the illustrated embodiments, the plurality of jack assemblies 12 are hingedly affixed to the vehicle frame at the proximal end 20 of the plurality of telescopic members 15, wherein the plurality of jack assemblies 12 are selectively movable between a stored position disposed within a recess of the plurality of recesses 26 parallel to the vehicle frame (as shown in FIG. 1), and a deployed position perpendicular to the vehicle frame (as shown in FIGS. 2A and 2B). In this manner, the plurality of jack assemblies 12 are disposed within the plurality of recesses 26 when not in use to ensure that the plurality of jack assemblies 12 do not interfere with the operation of the vehicle during use. In some embodiments, the plurality of recesses 26 comprise a cross-sectional area slightly less than that of the plurality of jack assemblies 12, such that the plurality of jack assemblies 12 are retained therein via frictional engagement. In such embodiments, when actuated, the plurality of jack assemblies 12 pivot about the proximal end 20 to deploy from the stored position within the plurality of recesses 26. Once the desired jack assembly 12 is in the deployed position, the plurality of telescopic members 15 extend to engage the ground surface to elevate a portion of the vehicle frame.

In the illustrated embodiment, a foot member 22 is affixed to the distal end 21 of the plurality of telescopic members 15, wherein a lower surface 23 of the foot member 22 frictionally engages the ground surface. In the shown embodiment, the foot member 22 tapers radially outward from an upper end 27 of the foot member 22 towards the lower surface 23, such that the lower surface 23 comprises a larger cross-sectional area than the upper end 27. In this manner, the weight of the vehicle is supported across a larger area to minimize the stress applied to the plurality of jack assemblies 12. In the shown embodiment, a plurality of textured elements 28 are disposed across the lower surface 23, wherein the plurality of textured elements 28 are configured to increase the surface area in contact with the ground surface during use, to frictionally engage the ground surface more securely. In the shown embodiment, the plurality of textured elements 28 comprise a series of parallel linear strips extending across a width of the lower surface 23, however alternate formats of textured elements 28 are contemplated.

Figure 3A:
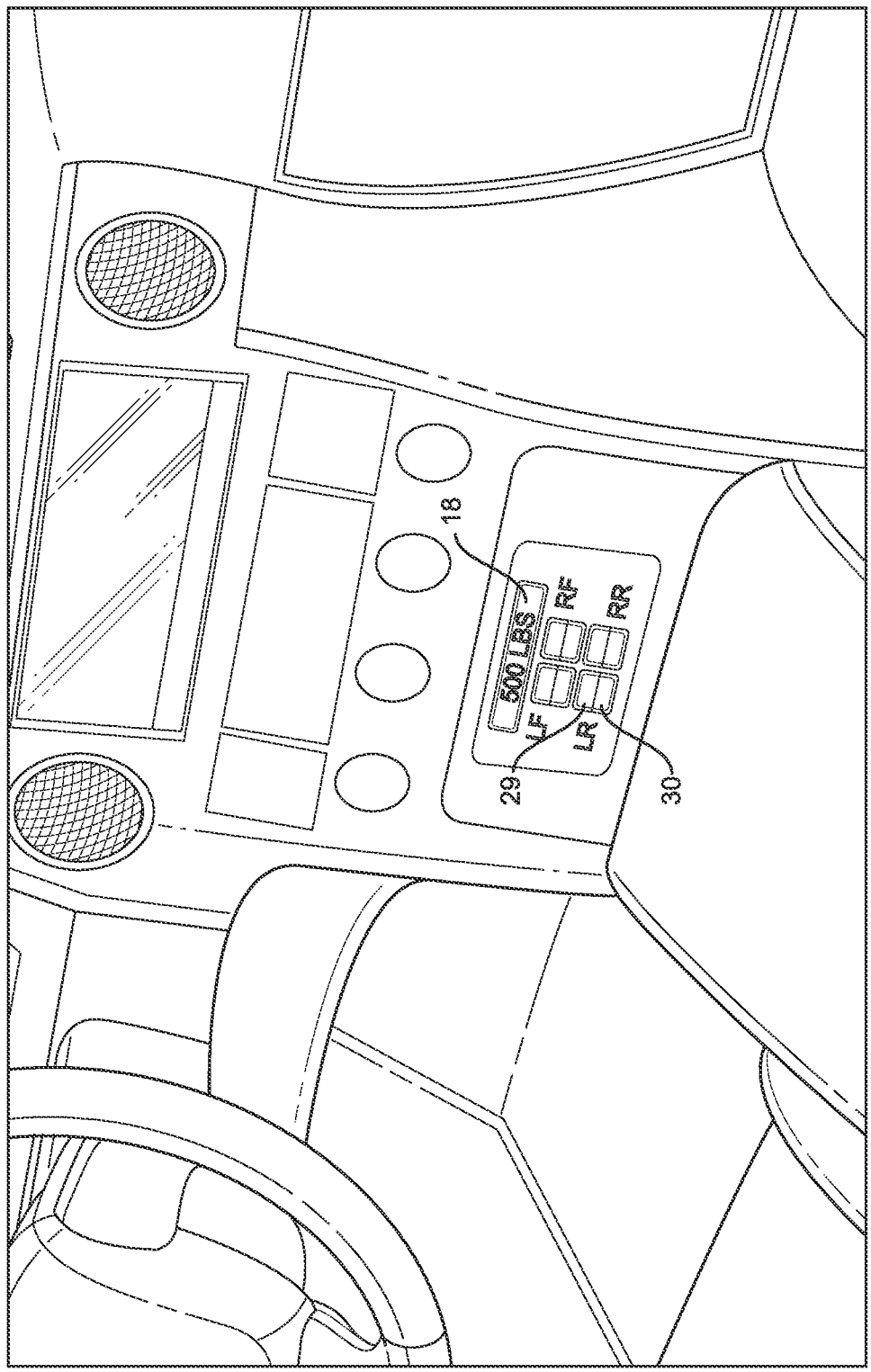
FIG. 3A shows a perspective view of a dashboard control panel of an embodiment of the integrated jack system for a vehicle.
Figure 3B:
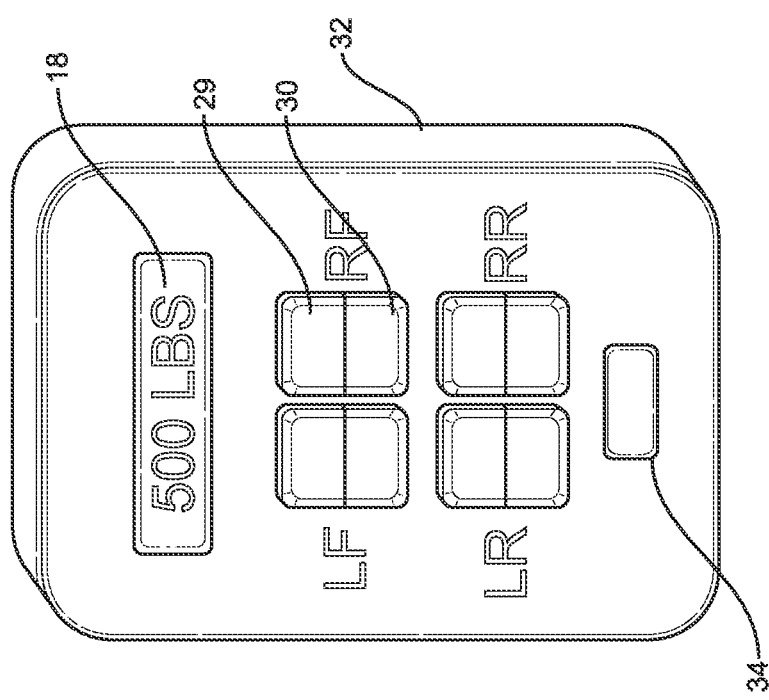
FIG. 3B shows a perspective view of a controller housing of an embodiment of the integrated jack system for a vehicle.
Figure 4:
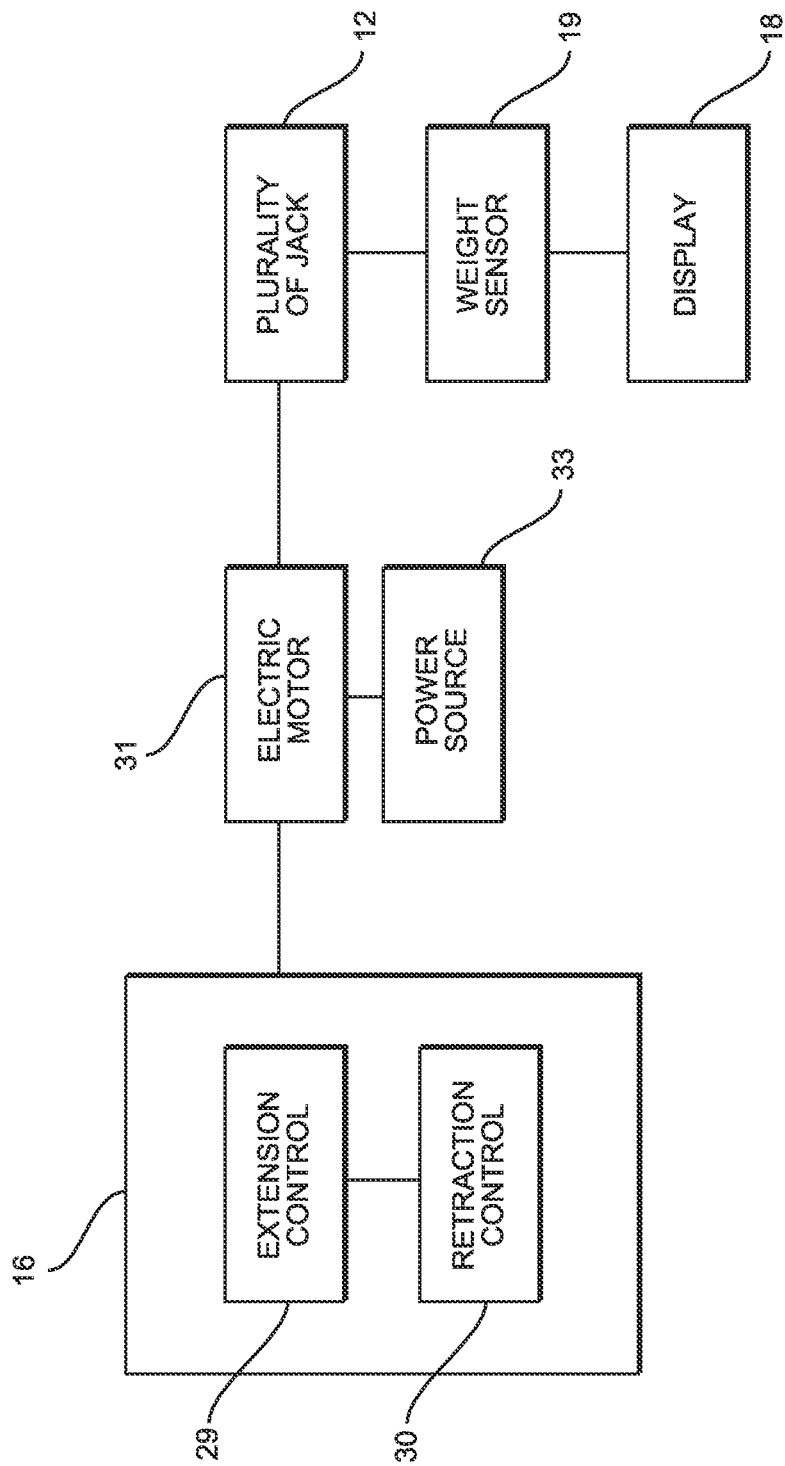
FIG. 4 shows a schematic view of an embodiment of the integrated jack system for a vehicle.

Referring now to FIGS. 3A and 3B, there is shown a perspective view of a dashboard control panel of an embodiment of the integrated jack system for a vehicle and a perspective view of a controller housing of an embodiment of the integrated jack system for a vehicle, respectively. In the illustrated embodiment of FIG. 3A, a control console is disposed within a vehicle cabin, such as integrated into a vehicle dashboard 17, wherein the control console comprises a plurality of controls associated with each of the plurality of jack assemblies. Alternatively, the plurality of controls may be disposed within a controller housing 32 in wireless communication with each of the plurality of jack assemblies, such that the user can remotely actuate each of the plurality of jack assemblies. The plurality of controls includes an extension control 29 and a retraction control 30, wherein the extension control 29 actuates a jack assembly of the plurality of jack assemblies to move the jack assembly to the extended position, whereas the retraction control 30 actuates the jack assembly to move the jack assembly to the retracted position. In the illustrated embodiment, each jack assembly is associated with a separate set of extension and retraction controls 29, 30. In such embodiments, the control console comprises indicia indicating which wheel is adjacent to the associated jack assembly. In some embodiments, a separate control is configured to actuate each jack assembly between the stored and deployed positions, however, it is contemplated that the extension control 29 may deploy the jack assembly from the recess until the jack assembly is perpendicular to the vehicle frame, at which point the jack assembly begins moving to the extended position. Similarly, the retraction control 30 may further store the jack assembly within the recess upon the jack assembly reaching a fully retracted state. Furthermore, in the shown embodiment of FIG. 3B, a power control 34 is disposed on the controller housing 32, wherein the power control 34 is configured to activate the integrated jack system. In the shown embodiments, a display 18 is disposed on the control console and the controller housing 32, respectively, wherein the display 18 is configured to display a weight supported on one or more of the jack assemblies via a weight sensor (as shown in FIG. 4, 19) disposed within each jack assembly. When multiple jack assemblies are in use simultaneously, the display 18 is configured to display a combined supported weight. In some embodiments, the controller housing 32 comprises an existing key fob for the associated vehicle, further providing remote start, door lock controls, trunk controls, and the like.

Referring now to FIG. 4, there is shown a schematic view of an embodiment of the integrated jack system for a vehicle. In the illustrated embodiment, the plurality of jack assemblies 12 are electrically actuated via an electric motor 31 operably connected to a power source 33. The power source 33 can comprise an independent power source or the power source of an associated vehicle. A weight sensor 19 is operably connected to each jack assembly of the plurality of jack assemblies 12, wherein the weight sensor 19 is configured to detect a weight supported by each jack assembly. Each weight sensor 19 is further operably connected to the display 18, such that the display 18 reports the combined supported weight across each jack assembly of the plurality of jack assemblies 12. Once actuated via the plurality of controls 16, the electric motor 31 selectively extends or retracts one or more jack assemblies of the plurality of jack assemblies 12 to elevate a portion of the vehicle. In one use, the user actuates the extension control 29 of a desired jack assembly to deploy and extend the jack assembly to elevate a portion of the vehicle frame from the ground surface. Once the desired work on the vehicle has been completed, the retraction control 30 is actuated to retract and store the jack assembly within a recess disposed on the underside of the vehicle frame. In this manner, the user is provided increase efficiency and decreased effort and discomfort when changing tires or otherwise examining the underside of the vehicle.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. An integrated jack system for a vehicle, comprising:
a plurality of jack assemblies disposed within a vehicle frame, wherein each of the plurality of jack assemblies is disposed adjacent to a vehicle wheelbase;
wherein each of the jack assemblies comprises a plurality of telescopic members selectively movable between an extended position and a retracted position;
a plurality of controls disposed within a vehicle cabin, wherein the plurality of controls is configured to actuate the plurality of jack assemblies between the extended position and the retracted position;
a display disposed within the vehicle cabin, wherein the display is operably connected to a weight sensor disposed within each of the plurality of jack assemblies to display a weight supported by each of the plurality of jack assemblies;
wherein a width of each telescopic member of the plurality of telescopic members increases in width from a proximal end of the jack assembly to a distal end of the jack assembly;
wherein each of the jack assemblies terminate in a foot member;
wherein a lower surface of the foot member frictionally engages a ground surface when the jack assembly is in the extended position;
wherein the plurality of jack assemblies is operably connected to a hydraulic tank disposed within the vehicle frame, such that the plurality of jack assemblies is hydraulically actuated;
wherein the hydraulic tank is centrally disposed within the vehicle frame;
wherein each of the plurality of jack assemblies are hingedly affixed to the vehicle frame, such that the plurality of jack assemblies selectively moves between a deployed position perpendicular to the vehicle frame and a stored position parallel to the vehicle frame; and
further comprising a plurality of recesses disposed within the vehicle frame, wherein each recess is dimensioned to receive a jack assembly of the plurality of jack assemblies therein when the jack assembly is in the stored position.

2. The integrated jack system for a vehicle of claim 1, wherein the foot member tapers radially outwardly such that the lower surface of the foot member comprises a greater width than an upper end of the foot member.

3. The integrated jack system for a vehicle of claim 1, further comprising a plurality of textured elements disposed along the lower surface of the foot member.

4. The integrated jack system for a vehicle of claim 1, wherein the plurality of controls includes at least an extension control and a retraction control for each of the plurality of jack assemblies, such that each jack assembly is independently actuated.

5. The integrated jack system for a vehicle of claim 1, wherein the plurality of jack assemblies is actuated via an electric motor.

6. The integrated jack system for a vehicle of claim 1, wherein the plurality of jack assemblies comprises a pneumatic system.

7. An integrated jack system for a vehicle, comprising:
a plurality of jack assemblies disposed within a vehicle frame, wherein each of the plurality of jack assemblies is disposed adjacent to a vehicle wheelbase;
wherein each of the jack assemblies comprises a plurality of telescopic members selectively movable between an extended position and a retracted position;
a controller housing in wireless communication with each of the plurality of jack assemblies, wherein the controller housing includes a plurality of controls configured to actuate the plurality of jack assemblies between the extended position and the retracted position when actuated;
a display disposed on the controller housing, wherein the display is operably connected to a weight sensor disposed within each of the plurality of jack assemblies to display a weight supported by each of the plurality of jack assemblies;

wherein a width of each telescopic member of the plurality of telescopic members increases in width from a proximal end of the jack assembly to a distal end of the jack assembly;

wherein each of the jack assemblies terminate in a foot member;

wherein a lower surface of the foot member frictionally engages a ground surface when the jack assembly is in the extended position;

wherein the plurality of jack assemblies is operably connected to a hydraulic tank disposed within the vehicle frame, such that the plurality of jack assemblies is hydraulically actuated;

wherein the hydraulic tank is centrally disposed within the vehicle frame;

wherein each of the plurality of jack assemblies are hingedly affixed to the vehicle frame, such that the plurality of jack assemblies selectively moves between a deployed position perpendicular to the vehicle frame and a stored position parallel to the vehicle frame; and further comprising a plurality of recesses disposed within the vehicle frame, wherein each recess is dimensioned to receive a jack assembly of the plurality of jack assemblies therein when the jack assembly is in the stored position.

8. The integrated jack system for a vehicle of claim 7, wherein the foot member tapers radially outwardly such that the lower surface of the foot member comprises a greater width than an upper end of the foot member.

9. The integrated jack system for a vehicle of claim 7, further comprising a plurality of textured elements disposed along the lower surface of the foot member.

10. The integrated jack system for a vehicle of claim 7, wherein the plurality of controls includes at least an extension control and a retraction control for each of the plurality of jack assemblies, such that each jack assembly is independently actuated.

11. The integrated jack system for a vehicle of claim 7, wherein the plurality of jack assemblies is actuated via an electric motor.

12. The integrated jack system for a vehicle of claim 7, wherein the plurality of jack assemblies comprises a pneumatic system.

* * * * *